May 17, 1966 E. W. BUTTENHOFF 3,252,010
SCR CONTROL CIRCUIT GATED BY UNIJUNCTION TRANSISTOR
RELAXATION OSCILLATOR WITH CAPACITIVE LINEARIZATION
Filed March 16, 1964
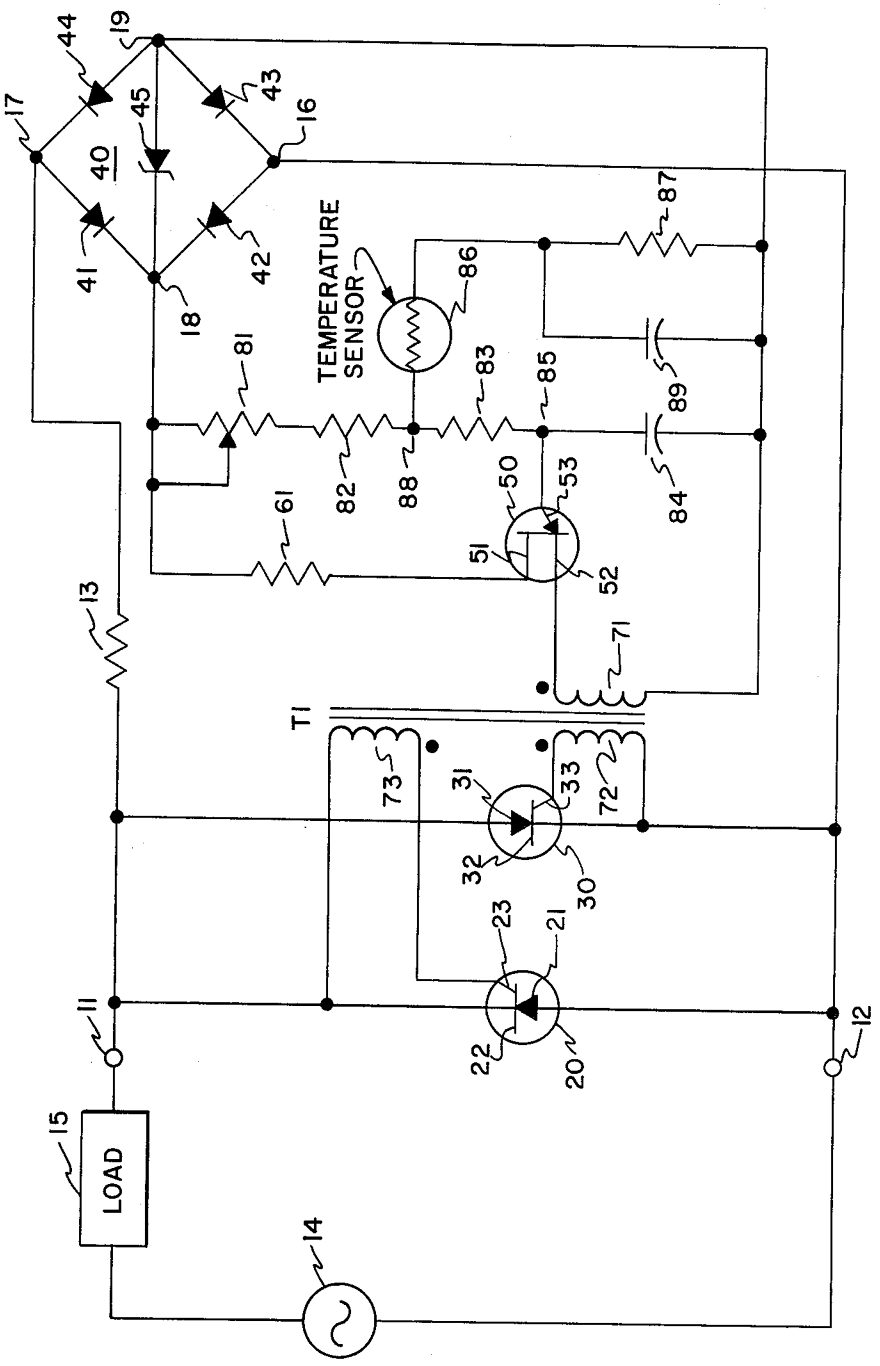
INVENTOR.
EDWARD W. BUTTENHOFF
BY
Francis A. Sirr
ATTORNEY 3,252,010

SCR CONTROL CIRCUIT GATED BY UNIJUNCTION TRANSISTOR RELAXATION OSCILLATOR WITH CAPACITIVE LINEARIZATION

Edward W. Buttenhoff, Excelsior, Minn., assignor to Honeywell Inc., a corporation of Delaware Filed Mar. 16, 1964, Ser. No. 352,075
7 Claims. (Cl. 307—88.5)

This invention is concerned with a control circuit and more particularly with a linear proportion controller utilizing silicon controlled rectifiers gated by a unijunction transistor relaxation oscillator.

The circuit of this application utilizes a well known silicon controlled rectifier (SCR circuit, in a new combination with additional circuit elements, which combination creates a new circuit capable of linear proportion control. The well known SCR circuit referred to above is commonly called a phase controlled A.C. switch. The A.C. switch, in general, utilizes a pair of back-to-back connected SCR's in series with a load and an A.C. source of power. A rectifier is connected across the back-to-back combination to provide a D.C. potential to a unijunction relaxation oscillator, which oscillator in turn controls the time at which turn-on of the SCR's occurs by providing an "on" pulse through transformer coupling to the gates of the SCR's. In normal operation, when either SCR is "on," power to the rectifier is shunted and therefore power is removed from the unijunction relaxation oscillator. It is this latter feature, in combination with the additional circuit elements disclosed in this application, which creates a new and useful invention. Briefly, the additional circuit elements make up a linearizing circuit that effects the time of firing of the unijunction transistor relaxation oscillator, and act as a form of negative feedback in determining the period of firing of the SCR's. The result is a linear relation between changes in load requirement and changes in power to the load.

The single figure is a schematic representation of a preferred embodiment of the invention.

In reference to the single figure, there is disclosed a pair of terminals 11 and 12, across which are serially connected a source of A.C. power 14 and a load 15. Load 15 is, for example, a heater located to heat an area in which a temperature sensitive resistance 86 is located. As will be apparent, resistance 86 controls the degree of energization of load 15. Also connected across terminals 11 and 12 are a pair of back-to-back connected silicon controlled rectifiers 20 and 30. SCR 20 has an anode 21 connected to terminal 12 and a cathode 22 connected to terminal 11. SCR has an anode 31 connected to terminal 11 and a cathode 32 connected to terminal 12. Terminal 11 is also connected through a resistor 13 to an input terminal 17 of a full wave rectifier 40 comprising diodes 41, 42, 43, and 44. Terminal 12 is connected to an input terminal 16 of rectifier 40. A voltage controlling zener diode 45 is connected between a pair of output terminals 18 and 19 of rectifier 40. Output terminal 18 is connected through a resistor 61 to a base electrode 51 of a unijunction transistor 50. Output terminal 19 is connected through a primary winding 71 of a transformer T1 to a base electrode 52 of unijunction transistor 50. Serially connected between terminals 18 and 19 are a variable resistance 81, a resistor 82, a resistor 83 and a capacitor 84. An emitter electrode 53 of unijunction transistor 50 is connected to a terminal 85 intermediate resistor 83 and capacitor 84. A resistor 87 and temperature responsive variable resistance 86 are serially connected between output terminal 19 and a terminal 88 intermediate resistor 82 and resistor 83. A capacitor 89 is connected across resistor 87. A secondary winding 72 of transformer T1 is connected between gate 33 of SCR 30 and terminal 12. Another secondary winding of transformer T1 is connected between gate 23 of SCR 20 and terminal 11.

The operation of the circuit of the single figure is as follows. Assuming the SCR's 20 and 30 are off, an A.C. voltage from source 14 will appear at input terminals 16 and 17 of a full-wave rectifier 40. This A.C. voltage will cause a D.C. voltage to be found at output terminals 18 and 19, with the polarity of terminal 18 positive and of terminal 19 negative.

This D.C. voltage will cause a current flow through resistors 81, 82 and 83 to charge capacitor 84. Current will also flow through temperature responsive variable resistance 86 and resistor 87, which current will cause capacitor 89 to store a charge.

When capacitor 84 has been charged to a predetermined level, which level is determined primarily by the voltage across terminals 18 and 19 and the emitter input characteristics of unijunction transistor 50, the unijunction transistor 50 will be caused to fire. The time of firing, in relation to the half cycles of A.C. source 14, for a given value of resistance 86, can be changed by adjustment of variable resistance 81. Capacitor 84 will then discharge causing a current to flow from one end of capacitor 84, from emitter 53 to base 52 of unijunction transistor 50, thence through primary winding 71 of transformer T1, and back to the other side of capacitor 84.

The current flow through primary winding 71 will induce a voltage on secondary windings 72 and 73. This induced voltage will be of a polarity to bias gates 23 and 33 to turn on SCR's 20 and 30 respectively. Since the SCR's are connected in parallel-inverse across A.C. source 14, only one will turn on, that is, despite the presence of an "on" bias at both gates 23 and 33, only the SCR which has its anode positive with respect to its cathode at the time the gate "on" bias is present will turn on.

When either SCR 20 or 30 turns on, it will have two effects. First, it will serve to connect load 15 across source 14 and thus allow a current to flow through and heat load 15 for the remaining portion of a half cycle of the A.C. source. Second, it will shunt power across input terminals 16 and 17 of rectifier 40, thus removing voltage from the relaxation oscillator comprising unijunction transistor 50. When the A.C. voltage next changes polarity during the succeeding half cycle, the gate bias pulse will be gone, and the "on" SCR will then be reverse biased and turned off, thus removing current from the load 15 and restoring voltage to the rectifier 40. The capacitor 84 will again begin to charge thus re-commencing the timing of the firing of the relaxation oscillator.

The operation as thus far described is that of a particular typical unijunction relaxation oscillator which is used to turn on an SCR, and where the SCR, when on, will remove power from the oscillator. It should now be noted that some of the current that flows through resistors 81 and 82 will then flow through temperature responsive variable resistance 86 and resistance 87. As resistance 86 varies with a change of temperature at load 15, the amount of current flow through resistance 86 will change, thus varying the current available to charge capacitor 84, and thus varying the firing time of the unijunction transistor 50. As an example, if the temperature at load 15 increases, the resistance value of resistance 86 will decrease thus drawing more current. The capacitor 84 will receive less current and the time of firing of the relaxation oscillator will be retarded, that is, firing will take place later in the half cycle of the A.C. source. Thus, the SCR's 20 and 30 will be "off" longer, and less power will be applied to heater load 15.

The operation of the circuit of the drawing as described to this point is that of a proportion temperature control circuit. However, the circuit as thus far described lacks linearity. That is, the power output to the load is not a linear function of the temperature of sensor 86.

To provide linearity this invention has in combination with the previously described components, the capacitor 89. Capacitor 89 is charged by the current which flows through resistance 86 and resistor 87. Further, capacitor 89 is chosen of a comparatively high value, so that it will not discharge rapidly. Thus, as a current is flowing to charge capacitor 84, a further current is flowing to charge capacitor 89. When capacitor 84 discharges through unijunction transistor 50, as described above, capacitor 89 will not discharge fully, and when power is again applied to the rectifier 40, the voltage on capacitor 89 will act as negative feedback by presenting a voltage to be summed in series with resistance 86 to vary the current flow to charge capacitor 84. That is, the RC time constant of capacitor 89 and its associate circuit is long relative to the time of a half cycle of the A.C. source 14. The voltage present on capacitor 89 is always of a polarity tending to fire unijunction 50 (a positive voltage on emitter 53). When a change in the firing angle of the unijunction is required by sensor 86, during the time period of the change, the change in voltage which occurs on capacitor 89 tends to resist this change in firing angle and this effect is termed negative feedback. The average charge on capacitor 89 is determined by the firing angle of the SCR's 20 and 30. Thus, if the SCR's fire earlier, power is removed from the rectifier 40 for a longer time, and capacitor 89 discharges further to assure a lower average charge. When power is returned to rectifier 40, capacitor 89 (with the lower average charge) will present less positive voltage to the circuit. Capacitor 84 will thus take longer to charge and the relaxation oscillator and thus the SCR's will fire later in the next half cycle of the A.C. source.

A similar series of events could be traced to show that capacitor 89 will also correct for an original later firing of the SCR's. It may also be noted that changing the value of resistor 87 would vary the proportioning band and the band-width of the linearity correction by changing the amount of discharge of capacitor 89.

It is apparent from the above explanation that the addition to a particular SCR phase controlled switch of a parallel RC network in series with a temperature responsive resistance has provided a new circuit capable of linear proportion temperature control of an A.C. energized load.

One of many possible sets of values for the components of the circuit of the single figure is given in the following Table 1. This and other sets of values have been tested and found to be operative.

*Table 1*

| | |
|---|---|
| Resistor **13** | 5K ohms, 5 watts. |
| Resistor **61** | 680 ohms. |
| Resistor **81** | 0–2K ohms. |
| Resistor **82** | 1.8K ohms. |
| Resistor **83** | 1K ohms. |
| Resistor **87** | 560 ohms. |
| Capacitor **84** | 0.1 μf. |
| Capacitor **89** | 10 μf. |
| Transistor **50** | 2N2646. |
| Diode **45** | ZA15A. |
| Diodes **41–44** | 1N457. |
| SCR's **20** and **30** | C22B. |

It will be obvious that the general principals herein disclosed may be embodied in many other embodiments, widely different from that illustrated, without departing from the spirit of the invention as defined in the following claims.

What is claimed is:

1. A control circuit for use in energizing a load from a source of A.C. voltage, comprising;

a controlled rectifier having input electrodes and having output electrodes adapted to be connected in series circuit through the load to the source of A.C. voltage, a unijunction transistor having input electrodes and output electrodes.

circuit means connecting the output electrodes of said transistor in controlling relation to the input electrodes of said rectifier to fire said rectifier upon firing of said transistor, and connecting the output electrodes of said transistor in parallel with the output electrodes of said rectifier, a first capacitor connected to the input electrodes of said transistor, variable resistance means connected in parallel with the output electrodes of said rectifier and connected to said first capacitor to charge the same during time periods in which said rectifier is nonconductive and at a rate determined by the magnitude of said resistance means, the charge on said first capacitor tending to fire said transistor, and said first capacitor being discharged upon firing of said transistor, and a further capacitor connected to said resistance means and to the input electrodes of said transistor to be charged during periods in which said rectifier is nonconductive, to not fully discharge upon firing of said transistor, and to apply a voltage to the input electrodes of said transistor in a manner tending to fire said transistor.

2. A control circuit as defined in claim 1 wherein the discharge time of said further capacitor is long relative to the time of a half cycle of the source of A.C. voltage.

3. A control circuit as defined in claim 1 which is adapted for use with a load in the form of an electrical heater and wherein said variable resistance means includes a temperature sensitive resistor adapted to be located in an area to be heated by the heater.

4. A control circuit as defined in claim 1 including rectification means connecting the output electrodes of said transistor and said variable impedance means in parallel with the output electrodes of said rectifier to thereby apply pulsating D.C. voltage to the output electrodes of said transistor and said variable impedance means, the individual pulses of D.C. voltage being interrupted upon firing of said rectifier, whereupon the charge on said further capacitor is an integration of the nonconductive time of said rectifier.

5. A control circuit as defined in claim 4 including a Zener diode connected to said rectification means to regulate said pulsating D.C. voltage.

6. A control circuit as defined in claim including a second controlled recifier having input electrodes and having output electrodes connected in parallel back-to-back relation to the output electrodes of the first named rectifier; wherein said circuit means connects the output electrodes of said transistor in controlling relation to the input electrodes of said second rectifier, and including a bridge rectifier which has its input terminals connected in parallel with the output electrodes of said rectifiers and has its output terminals connected to the output electrodes of said transistor and said variable resistance means.

7. A control circuit as defined in claim 1 wherein the further capacitor is connected to place a positive voltage on the emitter of the unijunction.

(References on following page)

References Cited by the Examiner

UNITED STATES PATENTS

| | | | |
|---|---|---|---|
| 3,111,008 | 11/1963 | Nelson | 307—88.5 |
| 3,131,545 | 5/1964 | Gross et al. | 307—88.5 |
| 3,146,392 | 8/1964 | Sylvan | 307—88.5 |
| 3,189,751 | 6/1965 | Winchel | 307—88.5 |
| 3,201,597 | 8/1965 | Balan | 323—119 |

ARTHUR GAUSS, *Primary Examiner.*

R. H. EPSTEIN, *Assistant Examiner.*